United States Patent
Takeshima

(10) Patent No.: US 7,867,943 B2
(45) Date of Patent: Jan. 11, 2011

(54) EXHAUST GAS PURIFYING CATALYST, AND METHOD FOR PRODUCING THE SAME

(75) Inventor: Shinichi Takeshima, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 528 days.

(21) Appl. No.: 11/408,987

(22) Filed: Apr. 24, 2006

(65) Prior Publication Data

US 2006/0189480 A1    Aug. 24, 2006

Related U.S. Application Data

(63) Continuation of application No. PCT/JP2004/017210, filed on Nov. 12, 2004.

(30) Foreign Application Priority Data

Nov. 14, 2003    (JP) ............... 2003-385707

(51) Int. Cl.
  *B01J 23/00* (2006.01)
  *B01J 21/00* (2006.01)
  *B01J 20/00* (2006.01)
  *B01J 29/00* (2006.01)
  *B01J 37/00* (2006.01)

(52) U.S. Cl. .................. 502/327; 502/328; 502/330; 502/332; 502/334; 502/339; 502/349; 502/350; 502/351; 502/355; 502/415; 502/439; 502/527.13; 502/304

(58) Field of Classification Search ............... 502/327, 502/328, 330, 332, 334, 339, 349, 350, 351, 502/355, 415, 439, 527.13, 304
See application file for complete search history.

(56) References Cited

U.S. PATENT DOCUMENTS

| | | | | |
|---|---|---|---|---|
| 4,501,823 | A * | 2/1985 | Masuda | 502/304 |
| 4,904,633 | A * | 2/1990 | Ohata et al. | 502/304 |
| 4,957,896 | A * | 9/1990 | Matsumoto et al. | 502/304 |
| 5,015,617 | A | 5/1991 | Ohata et al. | |
| 5,019,546 | A * | 5/1991 | Murakami et al. | 502/303 |
| 5,039,647 | A * | 8/1991 | Ihara et al. | 502/251 |
| 5,318,757 | A * | 6/1994 | Abe et al. | 422/174 |
| 5,416,055 | A * | 5/1995 | Okada et al. | 502/349 |
| 5,866,500 | A * | 2/1999 | Taguchi et al. | 502/326 |
| 5,895,772 | A * | 4/1999 | Grigorova et al. | 502/304 |
| 5,898,014 | A * | 4/1999 | Wu et al. | 502/302 |
| 5,945,369 | A * | 8/1999 | Kimura et al. | 502/304 |

(Continued)

FOREIGN PATENT DOCUMENTS

CN    1038032 A    12/1989

(Continued)

*Primary Examiner*—Cam N Nguyen
(74) *Attorney, Agent, or Firm*—Oliff & Berridge, PLC

(57) ABSTRACT

An exhaust gas purifying catalyst which is made excellent in heat resistance and in S-resistance by keeping the catalytic activity of Pt particles in a satisfactory state. The exhaust gas purifying catalyst is made such that a coating layer containing a compound oxide of cerium and an oxide of a metal for stabilizing the oxide of said cerium and an oxide containing no cerium is formed on a substrate, and such that platinum particles are carried on the catalyst. Said compound oxide has a pore volume of 0.1 cc/g or more, and said platinum particles are selectively adsorbed at the electron accepting points on said compound oxide.

6 Claims, 5 Drawing Sheets

U.S. PATENT DOCUMENTS

| | | | | |
|---|---|---|---|---|
| 5,972,830 | A * | 10/1999 | Yoshida et al. | 502/304 |
| 5,981,427 | A * | 11/1999 | Sung et al. | 502/325 |
| 5,989,507 | A * | 11/1999 | Sung et al. | 423/213.5 |
| 6,214,306 | B1 * | 4/2001 | Aubert et al. | 423/213.2 |
| 6,221,804 | B1 * | 4/2001 | Yamada et al. | 502/326 |
| 6,248,688 | B1 * | 6/2001 | Wu et al. | 502/302 |
| 6,261,989 | B1 * | 7/2001 | Tanaka et al. | 502/217 |
| 6,294,140 | B1 * | 9/2001 | Mussmann et al. | 423/213.5 |
| 6,335,305 | B1 * | 1/2002 | Suzuki et al. | 502/325 |
| 6,419,890 | B1 * | 7/2002 | Li | 423/239.1 |
| 6,497,848 | B1 * | 12/2002 | Deeba et al. | 422/180 |
| 6,576,207 | B1 | 6/2003 | Mussmann et al. | |
| 6,620,392 | B2 * | 9/2003 | Okamoto et al. | 423/213.5 |
| 6,682,706 | B1 | 1/2004 | Yamamoto et al. | |
| 6,787,500 | B2 * | 9/2004 | Ito et al. | 502/180 |
| 6,806,225 | B1 * | 10/2004 | Ikeda et al. | 502/326 |
| 6,808,687 | B1 * | 10/2004 | Uenishi et al. | 422/177 |
| 6,852,665 | B2 * | 2/2005 | Morikawa et al. | 502/302 |
| 6,864,214 | B2 * | 3/2005 | Uenishi et al. | 502/304 |
| 6,881,384 | B1 * | 4/2005 | Uenishi et al. | 422/177 |
| 6,896,857 | B2 * | 5/2005 | Nakamura et al. | 423/213.5 |
| 6,911,414 | B2 * | 6/2005 | Kimura et al. | 502/349 |
| 6,921,738 | B2 * | 7/2005 | Hwang et al. | 502/240 |
| 6,956,008 | B2 | 10/2005 | Takeshima et al. | |
| 6,967,186 | B2 * | 11/2005 | Takaya et al. | 502/325 |
| 7,220,702 | B2 * | 5/2007 | Hara et al. | 502/327 |
| 7,229,947 | B2 * | 6/2007 | Hara et al. | 502/327 |
| 2001/0022956 | A1 * | 9/2001 | Okamoto et al. | 423/213.5 |
| 2002/0048542 | A1 * | 4/2002 | Deeba et al. | 423/239.1 |
| 2002/0131914 | A1 * | 9/2002 | Sung | 422/177 |
| 2002/0137627 | A1 * | 9/2002 | Kayama et al. | 502/201 |
| 2003/0148875 | A1 * | 8/2003 | Kasahara et al. | 502/65 |
| 2003/0207759 | A1 * | 11/2003 | Nakamura et al. | 502/304 |
| 2003/0216254 | A1 | 11/2003 | Takeshima et al. | |
| 2004/0018123 | A1 * | 1/2004 | Okawara et al. | 422/177 |
| 2004/0028589 | A1 * | 2/2004 | Reisinger et al. | 423/240 S |
| 2004/0087439 | A1 * | 5/2004 | Hwang et al. | 502/302 |
| 2004/0151645 | A1 * | 8/2004 | Li | 423/213.5 |
| 2004/0198595 | A1 * | 10/2004 | Chen | 502/328 |
| 2004/0235651 | A1 * | 11/2004 | Uenishi et al. | 502/304 |
| 2005/0070431 | A1 * | 3/2005 | Alvin et al. | 502/439 |
| 2005/0175515 | A1 * | 8/2005 | Okawara | 422/180 |
| 2005/0266986 | A1 * | 12/2005 | Tanaka et al. | 502/326 |

FOREIGN PATENT DOCUMENTS

| | | |
|---|---|---|
| DE | 197 14 707 A1 | 10/1998 |
| EP | 0 870 543 A2 | 10/1998 |
| JP | A 8-176175 | 7/1996 |
| JP | A 10-194742 | 7/1998 |
| JP | A 11-19514 | 1/1999 |
| JP | A 11-21171 | 1/1999 |
| JP | A 2002-220228 | 8/2002 |
| JP | A 2003-334442 | 11/2003 |
| JP | A 2004-262702 | 9/2004 |

* cited by examiner

Heat Resistance

S-Resistance after Heat Deterioration

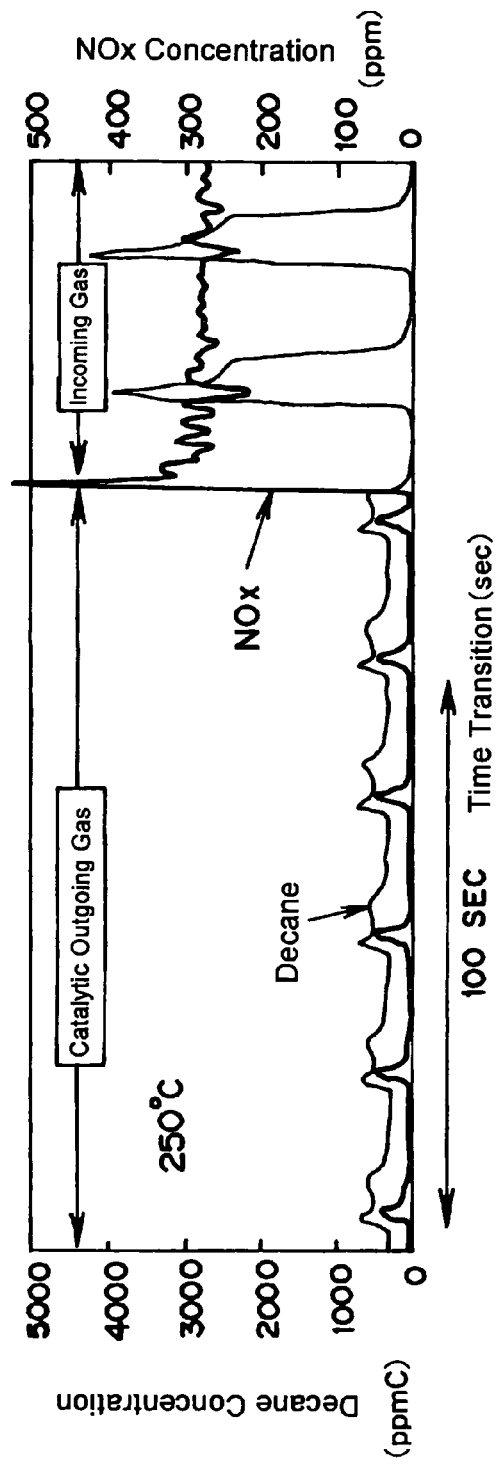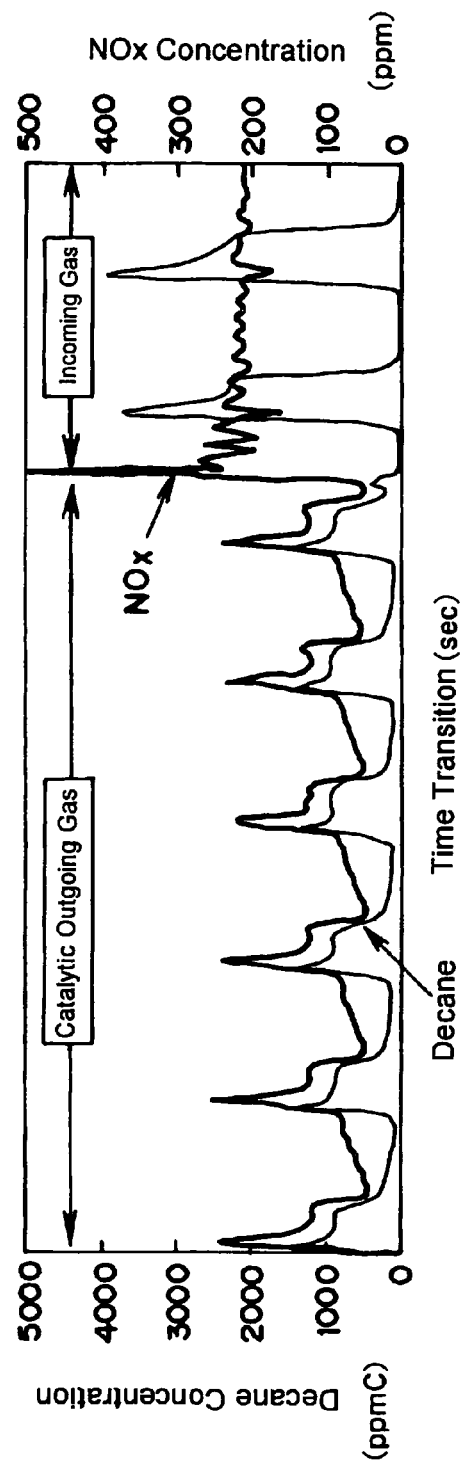

EXHAUST GAS PURIFYING CATALYST, AND METHOD FOR PRODUCING THE SAME

TECHNICAL FIELD

This invention relates to a catalyst for purifying the exhaust gas of an internal combustion engine such as a gasoline engine or a Diesel engine and, more particularly, to a catalyst, in which a coating layer containing cerium oxide (ceria) is formed on the surface of a substrate and on which platinum (Pt) particles are carried as a precious metal, and a producing method therefore.

BACKGROUND ART

The catalyst of this kind is enabled, by the oxygen storage capability (OSC) of ceria even when the exhaust gas composition near the catalyst component fluctuate in some measure, to oxidize the carbon oxide (CO) or the hydrocarbons (HC) contained in the exhaust gas and to reduce the nitrogen oxides (NOx). Thus, it is known that the catalyst containing ceria is excellent in the purifying ability of the exhaust gas. Since the absorption of oxygen is an exothermic reaction, moreover, the temperature rise of the catalyst can be promoted to exhibit the catalytic activity early. Therefore, it is also known that the ceria is excellent as assistant catalyst.

In case the ceria is employed in the coating layer, another metal oxide is employed together so as to keep the stability. Specifically, the ceria is used as a compound oxide with zirconium (Zr). An example of the cerium (Ce)-zirconium (Zr) compound oxide is disclosed in Japanese Patent Laid-Open No. 10-194742.

Here, the cerium-zirconium composite oxide is used as an assistant catalyst in not only a ternary catalyst but also a storage reduction type NOx purifying catalyst. Specifically, the storage reduction type NOx purifying catalyst carries such a NOx storage material together with the cerium-zirconium composite oxide as stores the NOx as a nitrate in an oxidizing atmosphere but releases the NOx in a reducing atmosphere. If the catalyst of this kind is employed as an exhaust gas purifying catalyst for the engine, in which the generation of NOx is augmented by the so-called "lean burning run" at a high air/fuel ration for improving the fuel economy, the purification can be performed by causing the NOx in the oxidizing atmosphere to be stored as a nitrate by the NOx storage material and the NOx in the reducing atmosphere to be released and reduced.

In the storage reduction type NOx purifying catalyst thus far described, the sulfur oxide contained in the exhaust gas is further partially oxidized by the catalytic particles of Pt or the like, and is stored in the form of sulfate by the NOx storage material. This sulfate is so chemically stabler than carbonate or nitrate that it is not easily released even in a high-temperature reducing atmosphere from the NOx storage material. In other words, the storage reduction type NOx purifying catalyst of the prior art is so easily poisoned with sulfur as to raise a problem that its catalytic activity is lowered with time.

DISCLOSURE OF THE INVENTION

This invention has been conceived noting the technical problems thus far described, and has an object to provide an exhaust gas purifying catalyst which can be prevented from being lowered in its activity by a sulfur poisoning and which is excellent in thermal endurance.

The exhaust gas purifying catalyst of the invention is characterized in that the cerium-zirconium composite oxide has a pore volume of 0.1 cc/g or more, and in that the platinum particles are selectively adsorbed at the electron accepting points on the compound oxide.

These electron accepting points are portions or acidic points, which are charged to a relatively negative (or minus) polarity by accepting electrons from the platinum particles. In order that the platinum particles may be selectively adsorbed at the electron accepting points, an aqueous solution of organic platinum may be impregnated in the coating layer having the cerium-zirconium composite oxide and then dried and sintered. Alternatively, the cerium-zirconium composite oxide powder and the organic platinum aqueous solution may be mixed into a slurry, and this slurry may be dried and sintered.

According to the exhaust gas purifying catalyst of the invention, therefore, the compound oxide having the platinum particles selectively carried at the electron accepting points is augmented in its specific surface area. As a result, it is possible not only to suppress the so-called "oxidization or migration" of the platinum particles but also to improve the low-temperature catalytic activity as a ternary catalyst after a high-temperature endurance.

According to the invention, moreover, there is provided an exhaust gas purifying catalyst, in which a coating layer containing a compound oxide of cerium and an oxide of a metal for stabilizing the oxide of said cerium and an oxide containing no cerium is formed on a substrate and on which platinum particles are carried. The exhaust gas purifying catalyst is characterized in that the cerium content of said compound oxide is 30 mols % or less with reference to the total mole number of the metal atoms contained, and in that said platinum particles are selectively adsorbed at the electron accepting points on said compound oxide.

According to this exhaust gas purifying catalyst, therefore, the content of cerium in the compound oxide is low, that is, the cerium is lean. As a result, not only the cerium or its oxide exist mainly on the surface side of the compound oxide particles but also the metal oxide of another compound metal such as zirconia is stable, so that a sulfur oxide (SOx) easily leaves the ceria. Accordingly, the water gas shift by the ceria can be promoted to remove the sulfate with a resultant reducing substance such as hydrogen. This sulfur component releasing reaction occurs even at a relatively low temperature so that the exhaust gas purifying function at the low temperature can be improved. On the other hand, the platinum particles are selectively carried at the electron accepting points in the aforementioned compound oxide so that the surfaces of the platinum particles are charged into the plus polarity. As a result, the platinum particles are suppressed, even after exposed to a high temperature, in the bond to the oxygen in the atmosphere so that they are kept satisfactory in the catalytic activity. Moreover, the platinum particles have a strong adhesion to the ceria or its vicinity so that they are suppressed in their migration and sintering. As a result, the subsequent catalytic activity at a low temperature can be kept in the satisfactory state.

In the invention, the NOx storage particles may be further carried.

If this NOx storage material is carried, the sulfur oxide having stuck to the NOx storage material can be removed by the reducing substance such as the hydrogen which has been produced by the water gas shifting reaction of ceria. Even after the high-temperature endurance, moreover, the catalytic activity of the platinum particles at the low temperature is kept in the satisfactory state so that a catalyst excellent in the NOx purifying ability can be obtained.

In the invention, rhodium particles can be carried in addition to the platinum particles. A method for producing such exhaust gas purifying catalyst is characterized in that the cerium content of the compound oxide of cerium and an oxide of a metal for stabilizing the oxide of said cerium is 30 mols % or less with reference to the total mole number of the metal atoms contained, and in that said coating layer is formed by mixing first powder, in which said platinum particles are selectively adsorbed at the electron accepting points on said compound oxide, and second powder, on which rhodium is carried, into a slurry, and by applying the slurry onto the substrate.

According to this producing method, when the catalyst having not only the platinum particles but also the rhodium particles carried as the catalytic particles is to be produced, the platinum particles are carried in advance at the electron accepting points in the compound oxide containing ceria, even if the rhodium oxide has a high electric negativity. Therefore, the platinum particles can be suppressed or prevented from being carried on the rhodium particles. As a result, it is possible to provide a catalyst which can keep the activities of the individual catalytic particles of platinum and rhodium and which is excellent in activity at a low temperature.

BRIEF DESCRIPTION OF THE DRAWINGS

FIG. 7 is a diagram plotting the results of measurements of low-temperature NOx purification percentages at the time of lean/rich run using the exhaust gas purifying catalysts of Invention Example 3 and Comparison 5.

BEST MODE FOR CARRYING OUT THE INVENTION

Figure 8:
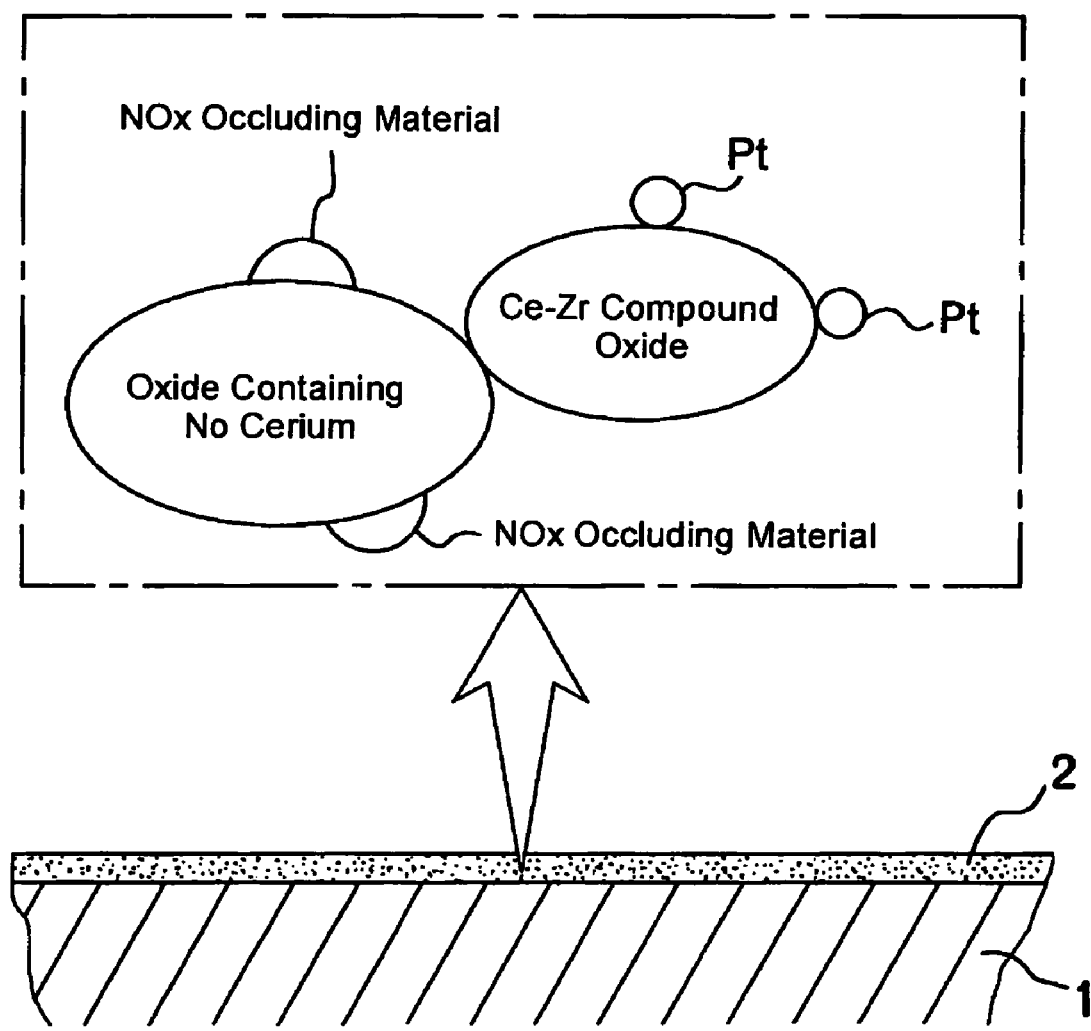
FIG. 8 is a schematic diagram for explaining the constitution of the exhaust gas purifying catalyst according to the invention.

This invention will be specifically described in the following. In an exhaust gas purifying catalyst of this invention, as schematically shown in FIG. 8, a substrate 1 has a ceria containing coating layer 2 formed thereon and carries platinum (Pt) particles. This substrate 1 may be either of a monolith type or in a pellet shape, if it is porous and excellent in heat resistance. A substrate made of cordierite can be employed as an example.

The ceria contained in the coating layer 2 is not necessarily sufficient per se in stability so that an oxide of another metal is used together for the stabilization. One example is zirconia, as exemplified in this invention by a cerium-zirconium compound oxide.

The content of cerium in the cerium-zirconium compound oxide is set to 30 mol % or less with reference to the total mole number of metal atoms contained in the compound oxide. This content is preferably 0.1 to 25 mol % or more preferably 0.5 to 10 mol %. This is because ceria is made to exist mainly near the surface to promote liberation of sulfur oxide thereby to promote the water gas shifting reaction of ceria.

An oxide containing no cerium can be mixed in addition to the aforementioned cerium-zirconium compound oxide with the coating layer 2. Alumina, zirconia or titania is employed as that oxide containing no cerium.

The Pt particles to function as catalytic particles are selectively adsorbed by electron accepting points in the aforementioned cerium-zirconium compound oxide. These electron accepting points are portions or acidic points, which are charged to a relatively negative (or minus) polarity by accepting electrons from the Pt particles. Specifically, the portions are located at or near the oxygen atoms making the ceria. It is, therefore, estimated that the Pt particles adsorbed by the electron accepting points are charged to a positive (or plus) polarity.

Various methods can be employed for causing the electron accepting points to adsorb the Pt particles. In one method, the slurry of the aforementioned cerium-zirconium compound oxide and γ-alumina as the oxide containing no cerium is wash-coated on the substrate and is dried and sintered to form the coating layer on the substrate. This coating layer is impregnated with a Pt carrying solution such as the organic platinum aqueous solution "SN" or "CN" (Trade Name) of ISHIFUKU Metal Industry Co., Ltd. and is then sintered. Here, it is not denied that the Pt particles stick to the portions other than the electron accepting points.

The prior art has employed the Pt carrying solution of a nitric acid group (having a shape, in which four nitro-groups are coordinated around Pt), for example. In this Pt carrying solution, complex ions are charged minus so that they have to be carried on the carrier at the plus-charged positions. In the cerium-zirconium compound oxide, however, those points are so few as to raise a problem that the carrying efficiency of Pt particles is low and decreases productivity. In the prior art, there has been employed a PT ammine complex having four ammonium ions coordinated around Pt. The complex ions themselves are charged plus and are easily adsorbed by the cerium-zirconium compound oxide. However, the complex ions are so highly resoluble that they are simply resolved, once they were adsorbed by oxygen near cerium, due to the presence of excessive ammonium ions existing therearound. As a result, there arises a problem that their entire carrying efficiency is lowered. If, on the contrary, the so-called "selective carriage organic platinum solution" such as the aforementioned organic platinum aqueous solution "SN" or "CN" of ISHIFUKU Metal Industry Co., Ltd. is employed, the Pt particles are adsorbed by oxygen existing near the ceria which easily transfers electrons with the Pt particles, thereby to improve the carrying efficiency of the Pt particles.

The Pt particles adsorbed by the electron accepting points are charged plus by transferring the electrons to the ceria, as described hereinbefore. This is estimated to result from that the bond between the oxygen ions and the cerium ions is weaker due to the characteristics of cerium than that between the zirconium and the oxygen ions. Even in the case of a high-temperature endurance, therefore, the oxygen is hardly adsorbed by the Pt particles thereby to keep the catalytic activity of the Pt particles.

This is investigated in relation to the oxygen around the Pt particles. It is estimated that the Pt particles weakly adsorb the oxygen around them thereby to enhance the activity of the oxygen ions (or active oxygen) produced from the oxygen around the Pt particles or from NOx. This enhanced activity raises the reactivity with hydrocarbons (HC) and promotes the releasing/reducing ability of the NOx. Moreover, the Pt particles are hardly attacked by oxygen so that they do not take the so-called "oxidized state" but are kept low in the vapor pressure. Moreover, the Pt particles and the ceria take the strong bonded state such as the covalent bond or the coordinate bond. It is estimated that the migration of the Pt particles is blocked. Therefore, the Pt particles are hard to sinter and accordingly to increase in particle diameter, and are kept close to the ceria so that the catalytic activity at a low temperature is kept satisfactory even after the high-temperature endurance.

The exhaust gas purifying catalyst of this invention can be embodied by a storage reduction type NOx purifying catalyst. For this, the catalyst carried a storage material. This NOx storage material is exemplified by at least one kind of alkaline metals of lithium (Li), sodium (Na), potassium (K) and rubidium (Rb), and alkaline earth metals of magnesium (Mg), calcium (Ca), strontium (Sr) and barium (Ba), and preferably by one kind of metal selected from Li, K and Ba. This NOx storage material is carried on the coating layer made of the aforementioned cerium-zirconium compound oxide and oxide containing no cerium. This carrying treatment is preferably done after the precious metal particles were carried, by impregnating the coating layer with a solution of acetate or nitrate of the aforementioned alkaline metal or the like and then by drying and sintering the coating layer.

The exhaust gas purifying catalyst according to this invention can be constituted into a ternary catalyst. In this case, the pore volume of the cerium-zirconium compound oxide is adjusted to 0.1 cc/g or larger. Here, this pore volume is determined from a nitrogen adsorption quantity. The compound oxide of this constitution is obtained by the so-called "microemulsion method", as described in Japanese Patent Laid-Open No. 2004-262702. Specifically, the primary particles of precursors of the aforementioned compound oxide are formed and are then made to agglomerate to form secondary particles. These secondary particles are made to agglomerate so gradually as to form pores of a sufficient size between themselves, and are then sintered. The adjustment of the spacing between those secondary particles and the proceeding of the agglomerations can be performed by suitably setting the basicity, pH, agitating time and so on of the colloidal solution, in which micelles containing the secondary particles are dispersed.

Even in case the exhaust gas purifying catalyst of this invention is constituted into the ternary catalyst, the sintering of the Pt particles is suppressed, as described hereinbefore, so that the Pt particles are enlarged in specific surface area. As a result, the purification percentages of the individual components of the ternary catalyst reaction can be improved so that the ternary catalyst can attain an exhaust gas purifying ability so similarly as if the carriage of the precious metal particles is augmented. Here, the ternary catalyst reaction does not have a special effect on the improvement in the low-temperature activity.

In this invention, precious metal particles other than the Pt particles can be used together as the catalytic particles, and have a high catalytic ability at a low temperature. It is, therefore, preferable to use rhodium (Rh) particles together. In this case, the rhodium oxide has a high electric negativity. In the state where the Pt particles are mixed, therefore, the Pt particles may undesirably stick to the rhodium oxide particles. In this invention, the particles, in which the Pt particles are carried, as called so, on the cerium-zirconium compound oxide, and the powder, in which the rhodium particles are carried on γ-alumina, cerium-zirconia or the like, are mixed and coated on the substrate.

Specifically, the powder of the aforementioned cerium-zirconium composite oxide is impregnated with the organic platinum aqueous solution SN or CN (Trade Name) of ISHI-FUKU Metal Industry Co., Ltd., and is sintered to produce the cerium-zirconium composite oxide powder carrying the Pt particles at the electron accepting points.

On the other hand, the powder of the aforementioned cerium-zirconium composite oxide is impregnated with an aqueous solution of rhodium nitrate and is then sintered to provide cerium-zirconium composite oxide powder carrying Rh particles. Alternatively, powder of γ-alumina is impregnated with an aqueous solution of rhodium nitrate and is then sintered to produce oxide powder carrying the Rh particles.

Either these two kinds of powder, i.e., the compound oxide powder carrying the Pt particles and the oxide powder carrying the Rh particles are mixed into a slurry, or the γ-alumina and an alumina sol are mixed with those two kinds of powder into a slurry. This slurry is wash-coated on the substrate and is then dried and sintered.

According to these methods, the Pt particles are strongly adsorbed, even if heated at the sintering time, by the electron accepting points on the cerium-zirconium composite oxide so that they hardly migrate. Moreover, the Pt particles are suppressed, even if charged plus, in adsorption of oxygen so that the Pt particles and the Rh particles are individually carried in isolated states to improve their individual catalytic abilities.

Embodiment 1

The performance improving effect of the ternary catalyst having a constitution, in which the pore volume of the cerium-zirconium composite oxide forming the coating layer had been augmented, was confirmed.

INVENTION EXAMPLE 1

In Invention Example 1, primary particles or the precursors of the cerium-zirconium composite oxide were produced by the microemulsion method described in Japanese Patent Laid-Open No. 2004-262702, and were made to agglomerate thereby to produce secondary particles. In this agglomeration process, the agglomeration of the secondary particles was controlled to prepare cerium-zirconium composite oxide powder having a pore volume of 0.1 cc/g or more. The cerium-zirconium composite oxide powder, γ-alumina as the oxide containing no cerium, an alumina sol and a proper quantity of ion exchanging water were mixed to produce a slurry. This slurry was wash-coated on a monolith substrate made of cordierite, and was dried and then sintered to form a coating layer. This coating layer was impregnated with an aqueous solution of 11.5 wt. % of organic platinum aqueous solution SN or CN (Trade Name) of ISHIFUKU Metal Industry Co., Ltd. at a ratio of 18 ml to 1 l of the substrate, and was then sintered at 500° C. for 1 hour to carry the Pt particles. The quantity of carriage of the Pt particles was 2 g (2 g/L) to 1 l of the substrate, the quantity of ceria was 0.16 mol (0.06 mols/L) to 1 l of the substrate, and the pH at the carrying time was "8". Here, the pore volume was measured by the known method of the prior art for measuring the adsorption of liquid nitrogen. The distribution of the pores is plotted in FIG. 1.

(Comparison 1)

A cerium-zirconium composite oxide adjusted without the treatment of augmenting the pore volume was employed to form the coating layer as in Invention Example 1. The nitrate Pt carrying solution (i.e., a solution of 5 wt. %) was employed to carry the Pt particles on the coating layer. Therefore, the pore volume was 0.1 cc/g or less. The measurement of the pore volume was made as in Invention Example 1. The distribution of the pores is plotted in FIG. 1. Moreover, the carriage of the Pt particles and the quantity of ceria were similar to those of Invention Example 1. Here, the pH of the carrying time was "2".

(Comparison 2)

This is similar to Invention Example excepting that the Pt carrying solution of the nitrate group of the prior art was employed to carry the Pt particles. Here, the pH at the carrying time was "2".

In order to confirm the ternary catalyst performances on those Invention Example and two Comparisons, duration runs were made by mounting the ternary catalyst on the exhaust system of a gasoline engine capable of adjusting the air/fuel ratio to rich, stoichiometric and lean values and by changing the air/fuel ratio to the vicinity of stoichiometric value and rich and lean values while keeping the catalyst temperature at about 1,000° C. for 5 hours. The subsequent purification temperatures of 50% of hydrocarbons (HC), carbon monoxide (CO) and NOx were measured. The results are plotted in FIG. 2.

Figure 2:
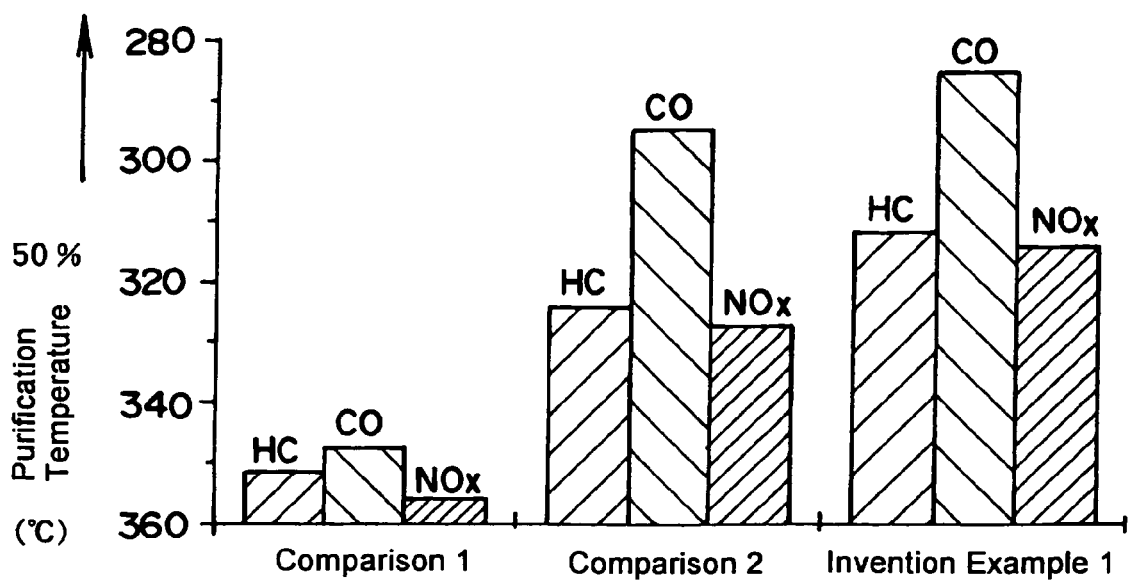
FIG. 2 is a diagram showing the results of measurements of purifying abilities of Invention Example 1 and Comparisons 1 and 2 as ternary catalysts.

As apparent from FIG. 2, the catalyst performance was improved by augmenting the pore volume, and the Pt particles were adsorbed at the electron accepting points of the coating layer made of the cerium-zirconium composite oxide, by employing the aforementioned organic Pt carrying liquid having the so-called "selectively adsorbing function" for the Pt particles, so that the catalyst performance was further improved. This improvement is thought to come from the fact that the contact between the Pt particles and the ceria was augmented to promote the water gas shifting reaction. From the results of Example 1, this invention set the pore volume of the cerium-zirconium composite oxide of the case of constituting it into the ternary catalyst, to 0.1 cc/g or more.

Embodiment 2

The performance coming from the fact that the Pt particles were selectively adsorbed at the electron accepting points of the cerium-zirconium composite oxide was confirmed.

INVENTION EXAMPLE 2

Figure 1:
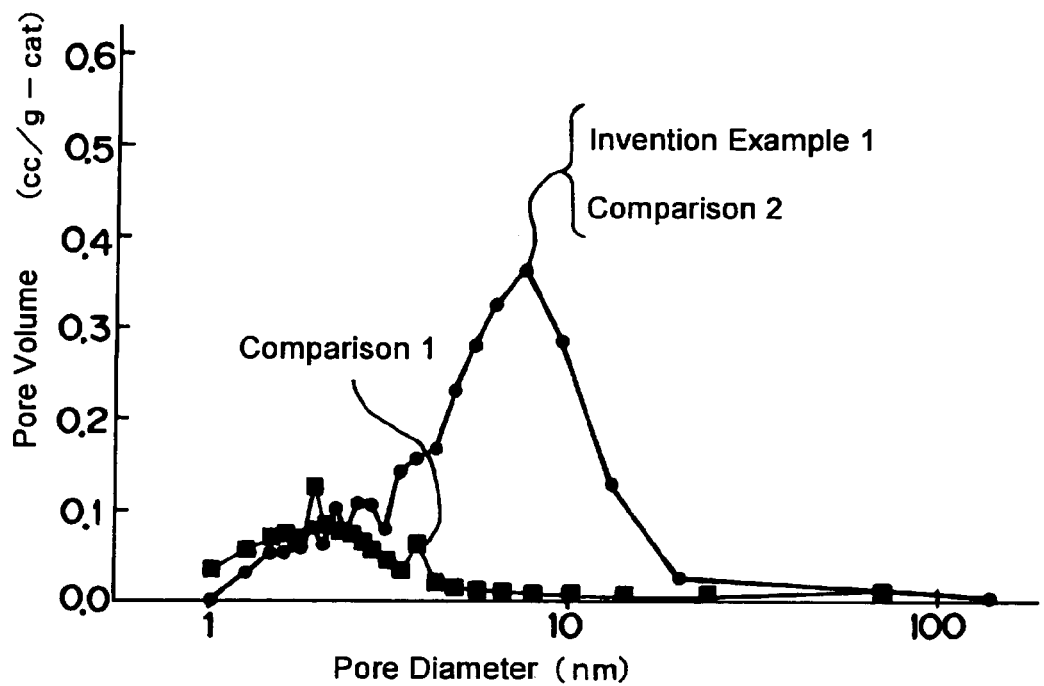
FIG. 1 is a diagram plotting the distributions of the pore volumes of coating layers in individual exhaust gas purifying catalysts of Invention Example 1 and Comparisons 1 and 2.

In Invention Example 2, primary particles or the precursors of the cerium-zirconium composite oxide were produced by the aforementioned microemulsion method, and were made to agglomerate thereby to produce secondary particles. In this agglomeration process, the agglomeration of the secondary particles was controlled to prepare cerium-zirconium composite oxide powder having a pore volume of 0.1 cc/g or more. The cerium-zirconium composite oxide powder, γ-alumina as the oxide containing no cerium, an alumina sol, a proper quantity of ion exchanging water and an aqueous solution of 11.5 wt. % of organic platinum aqueous solution SN or CN (Trade Name) of ISHIFUKU Metal Industry Co., Ltd. at a ratio of 18 ml to 1 l of the substrate were mixed to produce a slurry. This slurry was dried and then sintered at 500° C. for 1 hour to produce first powder. In this first powder, therefore, the Pt particles are adsorbed at the electron accepting points in the cerium-zirconium composite oxide. On the other hand, the aforementioned cerium-zirconium composite oxide powder, γ-alumina as an oxide containing no cerium, alumina sol and an aqueous solution of ion exchanging water and rhodium nitrate were mixed to produce a slurry, and was dried and then sintered to produce second powder carrying the Rh particles. Here, the distribution of the pores is shown in FIG. 1.

Figure 3:
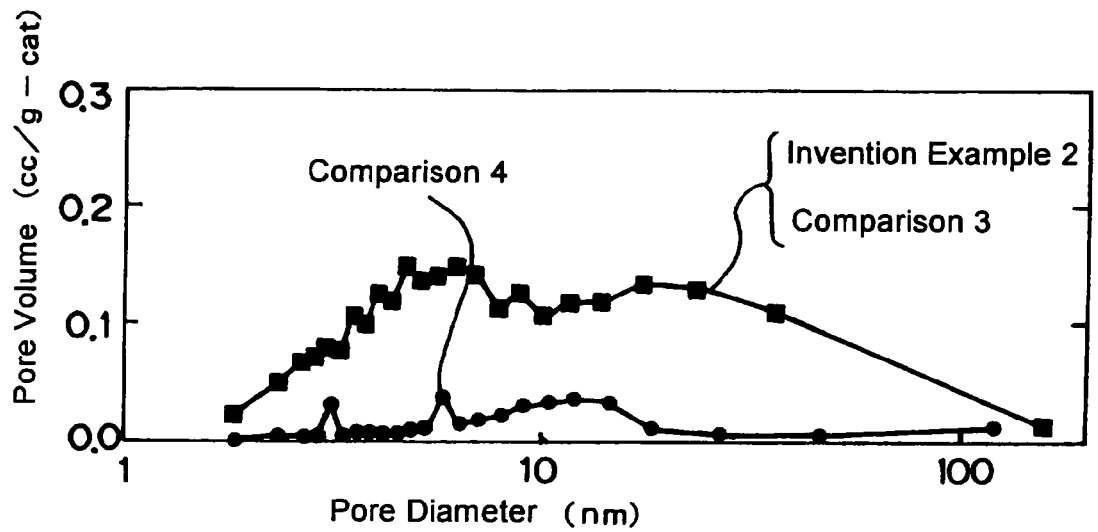
FIG. 3 is a diagram plotting the distributions of the pore volumes of coating layers in individual exhaust gas purifying catalysts of Invention Example 2 and Comparisons 3 and 4.

The aforementioned first powder carrying the Pt particles and the aforementioned second powder carrying the Rh particles were milled and mixed into a slurry by adding an inorganic binder such as an alumina sol and ion exchanging water. This slurry was wash-coated onto a monolith substrate made of cordierite, to form a coating layer. The distribution of the pores in this coating layer is plotted in FIG. 3. Moreover, this coating layer was impregnated with an aqueous solution of barium acetate, potassium acetate and lithium acetate, and was dried and then sintered to carry Ba, K and Li as the NOx storage material.

The content of cerium in the cerium-zirconium composite oxide forming the coating layer was adjusted to 30 mol % or less with reference to the total mole number of the metal atoms contained in the aforementioned compound oxide. Moreover, the carriage of the Pt particles was 2 g (2 g/L) to 1 liter of the substrate, and the carriage of the Rh particles was 0.5 g (0.5 g/L) to one liter of the substrate. Still moreover, the carriages of the individual NOx storage materials were: 0.2 mols/L for Ba; 0.1 mols/L for K; and 0.1 mols/L for Li to one liter of the substrate.

(Comparison 3)

A cerium-zirconium composite oxide prepared by augmenting the pore volume like the aforementioned exhaust gas purifying catalyst of Invention Example 2 was employed to form a coating layer on a monolith substrate made of cordierite. The content of the cerium in the cerium-zirconium composite oxide forming that coating layer was adjusted to 30 mol % or less with reference to the total mole number of the metal atoms contained in the aforementioned compound oxide. That coating layer was impregnated with a Pt carrying solution (e.g., an aqueous solution of tetranitro-platinum complex ammonium: a concentration of 6 wt. %) of a nitrate group, and was then sintered to carry the Pt particles and the Rh particles. Here, the pore volume of the compound oxide was 0.1 cc/g or higher. Moreover, the carriages of Ba, K and Li or the NOx storage materials were performed as in the aforementioned Invention Example 2. The individual carriages were: 2 g/L for Pt; 0.5 g/L for Rh; 0.2 mols/L for Ba; 0.1 mols/L for K; and 0.1 mols/L for Li.

(Comparison 4)

A cerium-zirconium composite oxide prepared by not performing the augmentation of the pore volume was employed to form a coating layer on a monolith substrate made of cordierite. The pore volume of the compound oxide was 0.1 cc/g or less, and the pore distribution is plotted in FIG. 3. In order to equalize the element quantity of the cerium in the coating layer to the aforementioned one of Invention Example 2, moreover, the cerium concentration in the cerium-zirconium composite oxide was raised, but the quantity in the coating layer was reduced to augment the quantities of the metal oxides other than that of ceria relatively. The content of the cerium at this time was five times as high as that of Invention Example 2 and was adjusted to 30 mol % or less with reference to the total mole number of the metal atoms contained in the aforementioned compound oxide. That coating layer was impregnated with a Pt carrying solution (e.g., an aqueous solution of tetranitro-platinum complex ammonium: a concentration of 2 wt. %) of a nitrate group, and was then sintered to carry the Pt particles and the Rh particles. Here, the carriages of Ba, K and Li or the NOx storage materials were performed as in the aforementioned Invention Example 2. The individual carriages were: 2 g/L for Pt; 0.5 g/L for Rh; 0.2 mols/L for Ba; 0.1 mols/L for K; and 0.1 mols/L for Li.

A resistance to sulfur (i.e., an S-resistance) was examined on the exhaust gas purifying catalysts of the aforementioned Invention Example 2 and the aforementioned individual Comparisons 3 and 4. Regenerations were performed by causing each catalyst of 1 liter to adsorb a sulfur content of 3 g and by heating the catalyst in an exhaust gas containing no sulfur at 650° C. for 10 minutes. The NOx purification percentages were measured on the exhaust gas (or a standard exhaust gas), which is generated in case the engine was run at an air/fuel ratio set at the stoichiometric value. The measurement results of the NOx purification percentage are plotted in FIG. 4.

Figure 4:
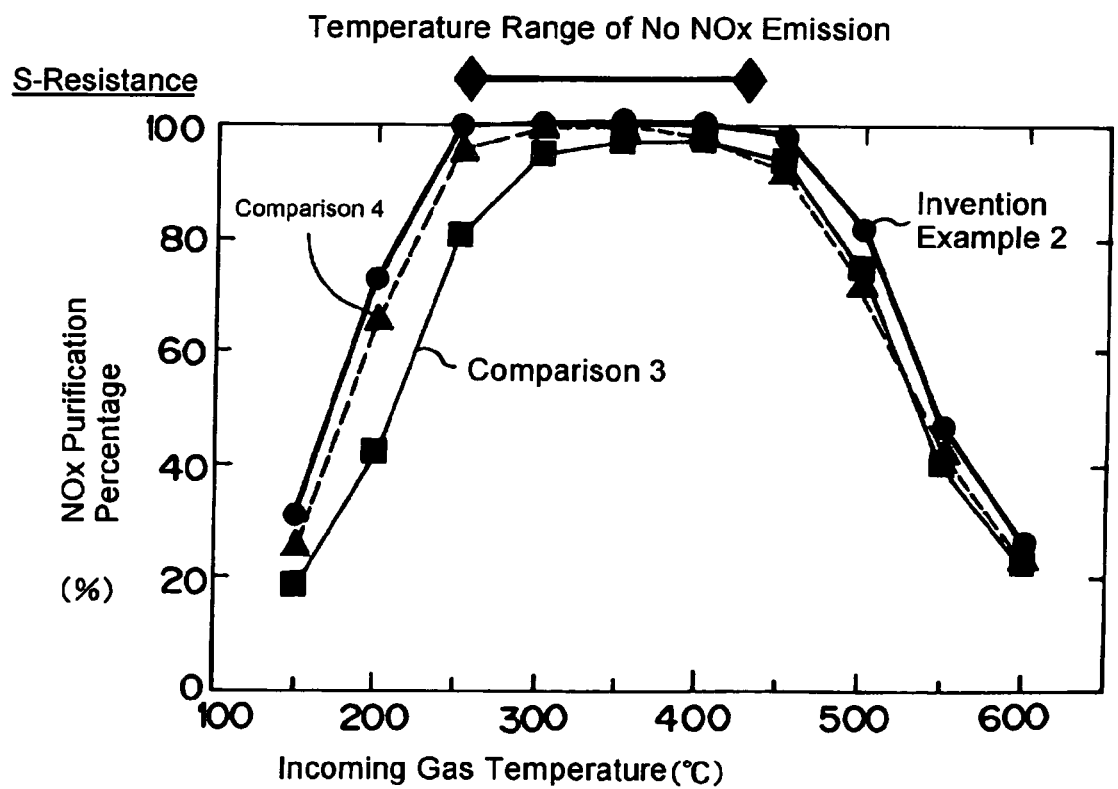
FIG. 4 is a diagram plotting the results of measurements of NOx purification percentages of individual exhaust gas purifying catalysts, as poisoned by sulfur and after regenerated, of Invention Example 2 and Comparisons 3 and 4.

According to Invention Example 2, as apparent from FIG. 4, a higher purification percentage than those of individual Comparisons 3 and 4 is exhibited in the whole temperature range from low to high temperatures. Especially in contrast to Comparison 3 having the cerium content in the coating layer lowered as in Invention Example 2, the NOx purification percentage at a low temperature (150° C. to 250° C.) is improved better. It is estimated that the improvement was brought by the promotion of release of sulfur contents with active oxygen produced around the Pt particles, the active oxygen produced by the cerium and with a reducing gas such as hydrogen, for the following reasons: because the positions for carrying the Pt particles were different due to the difference in the Pt carrying solution; because the coating layer was formed in Invention Example 2 after the Pt particles and the Rh particles had been individually carried by the cerium-zirconium composite oxide; and because the content of cerium was low in spite of large pore volume.

Next, the heat resistances of the exhaust gas purifying catalysts of Invention Example 2 and Comparisons 3 and 4 were examined. The individual catalysts were heated for heat resistances in the repeated atmospheres of a lean air/fuel ration (A/F)=20 for 1 minute and a rich A/F=14 for 1 minute at 800° C. for 5 hours. After this, the NOx purification percentages were measured by employing the standard exhaust gas. Specifically, the NOx purification percentages at the individual temperatures were measured by sequentially raising the temperature of the exhaust gas to flow into the individual catalysts. The measurement results are plotted in FIG. 5.

Figure 5:
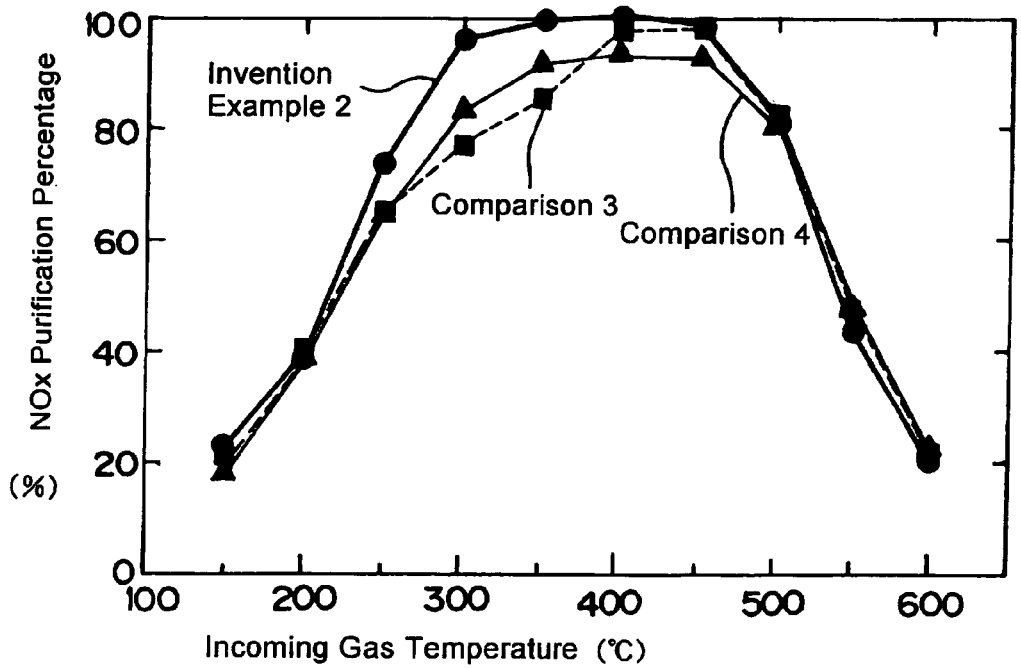
FIG. 5 is a diagram plotting the results of measurements of NOx purification percentages of individual exhaust gas purifying catalysts, after heat endurance, of Invention Example 2 and Comparisons 3 and 4.

According to Invention Example 2, as apparent from FIG. 5, it is found that the NOx purification percentages within the temperature range of 200° C. to 500° C. are superior to those of the exhaust gas catalysts of the individual Comparisons 3 and 4. The main differences of Invention Example 2 from the individual Comparisons 3 and 4 reside in that the solution having the so-called "selective adsorptivity" of the Pt particles was employed in Invention Example 2 to carry the Pt particles, and in that the Pt particles and the Rh particles were individually carried by the cerium-zirconium composite oxide. It is, therefore, estimated in Invention Example 2 that the "oxygen poisoning" and the sintering of the Pt particles were suppressed to keep the catalyst activity of the Pt particles in a satisfactory state even after the heat resistance.

Moreover, the sulfur-resistance (or the S-resistance) was also examined. After the individual catalysts of Invention Example 2 and Comparison 4 had been subjected to the heat-resistance, the individual catalysts of 1 liter were poisoned by adsorbing the sulfur content of 3 g and were then regenerated by heating them in the exhaust gas of A/F=14 at 650° C. for 10 minutes. After this, the NOx purification percentage was measured on the standard exhaust gas. The measurement results of the NOx purification percentage are plotted in FIG. 6.

Figure 6:
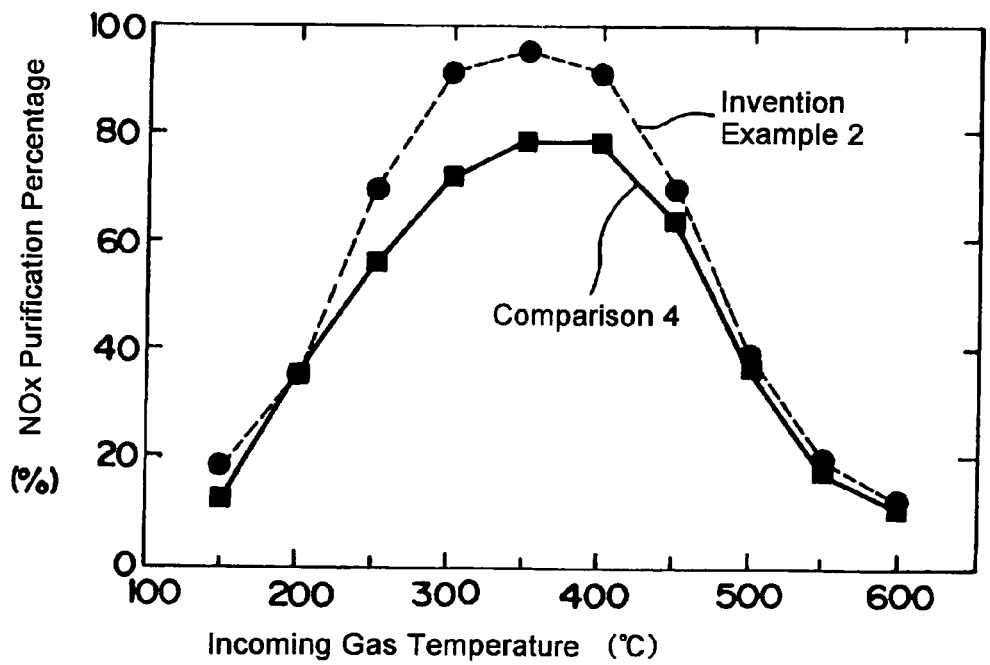
FIG. 6 is a diagram plotting the results of measurements of NOx purification percentages of individual exhaust gas purifying catalysts, after heat deterioration, as poisoned by sulfur and after regenerated, of Invention Example 2 and Comparison 4.

As apparent from FIG. 6, the exhaust gas purifying catalyst of Invention Example 2 exhibits a higher NOx purification percentage than that of the catalyst of Comparison 4 and is prominent in the effect to improve the NOx purification percentage within the temperature range of 200° C. to 500° C. In short, Invention Example 2 is excellent in the release of sulfur. It is estimated that the excellence is invited mainly for the following reasons: because the exhaust gas purifying catalyst of Invention Example 2 had a low cerium content in the cerium-zirconium composite oxide forming the coating layer; because the Pt particles were selectively adsorbed at the electron accepting points so that the Pt particles were charged plus; and because the sulfur on the Pt particles were easily releasable like the oxygen while being suppressed in their migrations and in the according sintering.

Embodiment 3

The reducibility of NOx at a low temperature under Diesel conditions was examined.

INVENTION EXAMPLE 3

An exhaust gas purifying catalyst employed in Invention Example 3 was similar to that of the aforementioned Invention Example 2. Specifically, the content of cerium in the cerium-zirconium composite oxide forming the coating layer was 30 mol % or less with reference to the total mole number of the metal atoms contained in the aforementioned compound oxide. Moreover, the carriage of the Pt particles was 2 g/L, the carriage of the Rh particles was 0.5 g/L, and the carriages of the individual NOx storage materials were: 0.2 mols/L for Ba; 0.1 mols/L for K; and 0.1 mols/L for Li. Moreover, the pore volume of the coating layer was 0.1 cc/g or more. Here, the Pt particles were selectively adsorbed at the electron accepting points in the cerium-zirconium composite oxide.

(Comparison 5)

The exhaust gas purifying catalyst employed in Comparison 5 was the aforementioned one of Comparison 3. It is, therefore, thought that the Pt particles were not subjected to the treatment of the so-called "selective adsorption", and the Pt particles and the Rh particles were simultaneously carried on the coating layer so that the Pt particles rode on the Rh particles. Here, the individual carriages were: 2 g/L for Pt; 0.5 g/L for Rh; 0.2 mols/L for Ba; 0.1 mols/L for K; and 0.1 mols/L for Li.

The carbon component concentrations and the NOx concentrations were measured on the incoming gas to flow into the catalyst and the outgoing gas to be discharged, by repeating and switching the test gas containing decane as a reducer at a temperature condition of 250° C. between the lean condition (A/F=20, as converted into the A/F of the fuel) of 20 seconds and the rich condition (A/F=14, as converted into the A/F of the fuel) of 5 seconds. The measurement results are plotted in FIG. 7.

According to Invention Example 3, as apparent from FIG. 7, not only the HC purification factor but also the NOx purification factor can be improved in the case of the lean run, in which the carriage of the Pt particles was low whereas the production of the NOx was high. It is estimated that the so-called "oxygen poisoning" of the Pt particles was suppressed in Invention Example 3 so that the catalyst activity was excellent even at the low temperature, because the Pt particles were selectively adsorbed at the electron accepting points in the cerium-zirconium composite oxide so that they were charged plus.

INDUSTRIAL APPLICABILITY

This invention can be utilized in the field for manufacturing a catalyst for purifying an exhaust gas produced by burning a fuel and in the industrial field to manufacture a vehicle using an internal combustion engine as a power source.

The invention claimed is:

1. A method for producing an exhaust gas purifying catalyst, the method comprising:
  producing a first powder in which platinum particles are carried on a compound oxide, wherein the compound oxide includes an oxide of cerium, an oxide of a metal for stabilizing the oxide of the cerium, and an oxide containing no cerium, by impregnating the compound oxide with an organic platinum aqueous solution to transfer electrons from the platinum particles in the organic platinum aqueous solution to the compound oxide to charge the compound oxide to a negative polarity and to charge the platinum particles to a positive polarity thereby causing an electron accepting point of the compound oxide to absorb the platinum particles selectively, and by sintering the compound oxide to which the platinum particles are absorbed;
  producing a second powder, in which rhodium particles are carried on an oxide, by impregnating the oxide with an aqueous solution of rhodium nitrate, and sintering the oxide to which the rhodium nitrate is absorbed;
  preparing a slurry by mixing together the first powder and the second powder;
  applying said slurry onto a substrate; and then
  drying and sintering the slurry to form a coating layer on the substrate;
  wherein
  the cerium content of the compound oxide is 30 mole percent or less with reference to a total mole number of metal atoms of the compound oxide.

2. The method for producing an exhaust gas purifying catalyst as set forth in claim 1, wherein
  the compound oxide has a pore volume of 0.1 cc/g or more.

3. The method for producing an exhaust gas purifying catalyst as set forth in claim 1, wherein the oxide of the second powder is selected from alumina, and a compound oxide of an oxide including an oxide of cerium and an oxide of a metal for stabilizing the oxide of cerium.

4. The method for producing an exhaust gas purifying catalyst as set forth in claim 1, wherein the method further comprises impregnating the coating layer with an NOx storage material.

5. A method for producing an exhaust gas purifying catalyst having a coating layer, the method comprising:
  forming a coating layer on a substrate, the coating layer comprising a compound oxide, wherein the compound oxide includes an oxide of cerium, an oxide of a metal for stabilizing the oxide of cerium and an oxide containing no cerium, impregnating the coating layer formed on the substrate with an aqueous solution of organic platinum thereby transferring electrons from platinum particles in the aqueous solution of organic platinum to the coating layer to charge the compound oxide to a negative polarity and to charge the platinum particles to a positive polarity and absorbing the platinum particles selectively to an electron accepting point of the compound oxide; and
  then sintering the coating layer;
  wherein:
    the platinum particles are selectively carried at the electron accepting points on the compound oxide; and
    the cerium content of the compound oxide is 30 mole percent or less with reference to a total mole number of metal atoms of the compound oxide.

6. The method for producing an exhaust gas purifying catalyst as set forth in claim 5, wherein;
  the coating layer is prepared by preparing a slurry containing the compound oxide, the compound oxide having a powder having a pore volume of 0.1 cc/g or more, applying the slurry onto the substrate, and thereafter drying and sintering the prepared slurry on the substrate.

* * * * *